United States Patent [19]
Hausman et al.

[11] Patent Number: 5,435,131
[45] Date of Patent: Jul. 25, 1995

[54] ADAPTIVE OVERSPEED CONTROL FOR A HYDROSTATIC TRANSMISSION

[75] Inventors: Dennis J. Hausman, Peoria; Stephen W. Rector, Metamora; David P. Smith, Joliet; Steven T. Ufheil, Peoria, all of Ill.

[73] Assignee: Caterpillar Inc., Peoria, Ill.

[21] Appl. No.: 225,686

[22] Filed: Apr. 11, 1994

[51] Int. Cl.⁶ .................. F16D 31/00; F16D 31/02
[52] U.S. Cl. ............................... 60/327; 60/448
[58] Field of Search .......... 60/431, 327, 445, 448, 60/451, 459, 487, 452

[56] References Cited

U.S. PATENT DOCUMENTS

| | | | |
|---|---|---|---|
| 3,628,330 | 12/1971 | Miller | 60/448 X |
| 4,080,850 | 3/1978 | Bubula et al. | 74/861 |
| 4,191,270 | 3/1980 | Monteith | 60/448 X |
| 4,474,104 | 10/1984 | Creffield | 60/448 X |
| 4,523,892 | 6/1985 | Mitchell et al. | 417/34 |
| 4,534,707 | 8/1985 | Mitchell | 417/34 |
| 5,070,695 | 12/1991 | Metzner | 60/448 |
| 5,184,466 | 2/1993 | Schmederjan et al. | 60/448 |
| 5,341,311 | 8/1994 | Lieber | 60/448 X |

FOREIGN PATENT DOCUMENTS

| | | |
|---|---|---|
| 0558958A1 | 9/1993 | Germany . |
| 1110884 | 4/1989 | Japan .................. 60/452 |

Primary Examiner—Edward K. Look
Assistant Examiner—Hoang Nguyen
Attorney, Agent, or Firm—James R. Yee

[57] ABSTRACT

An apparatus and method for controlling a variable displacement motor of a hydrostatic transmission is provided. The apparatus includes an engine, and a hydraulic pump mechanically coupled to the engine. The variable hydraulic motor includes an output shaft. The apparatus monitors rotational speed of the output shaft. The apparatus and method control motor displacement and detect and/or predict the occurrence of an overspeed condition. The displacement of the motor is modified if an overspeed condition is predicted and/or detected.

17 Claims, 3 Drawing Sheets

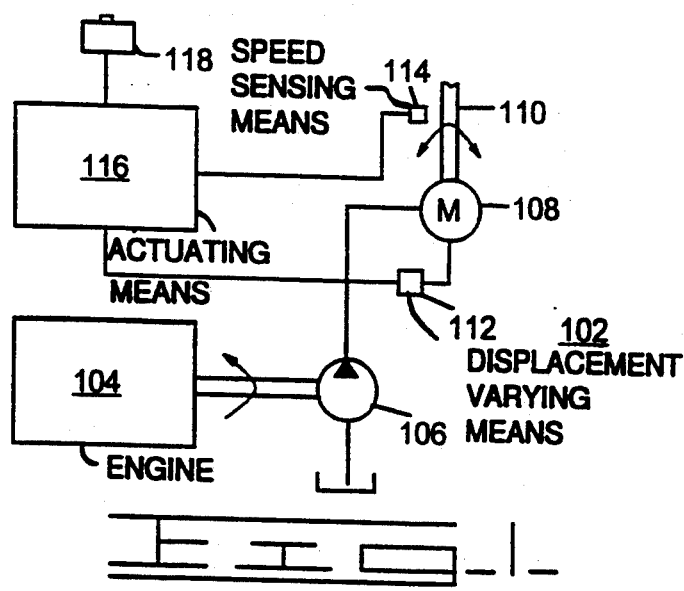
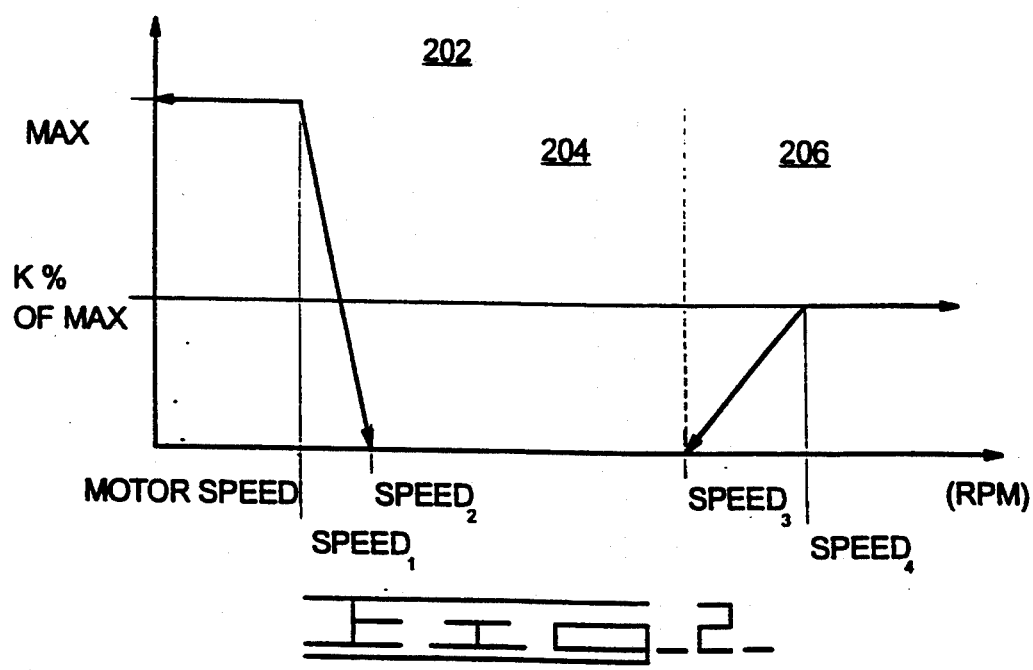

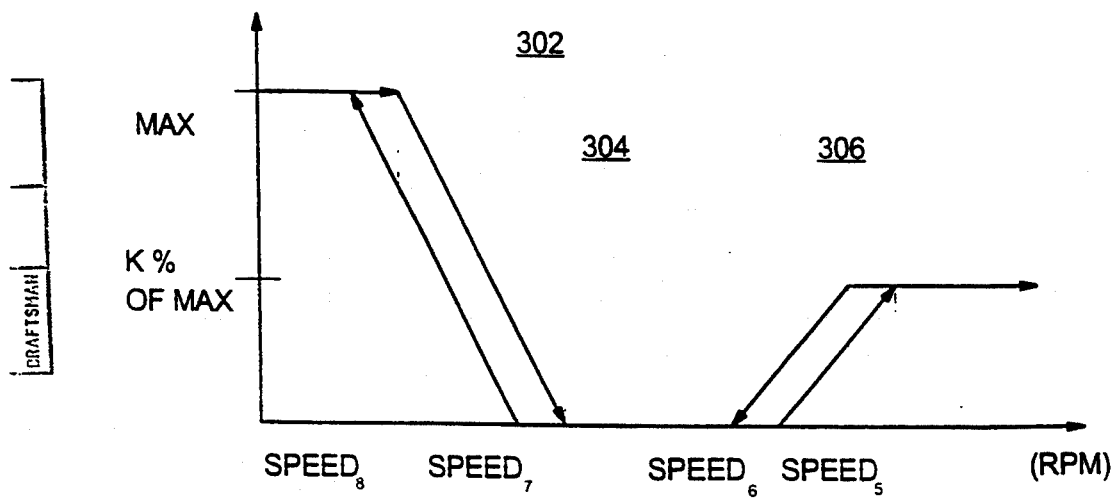
FIG_3
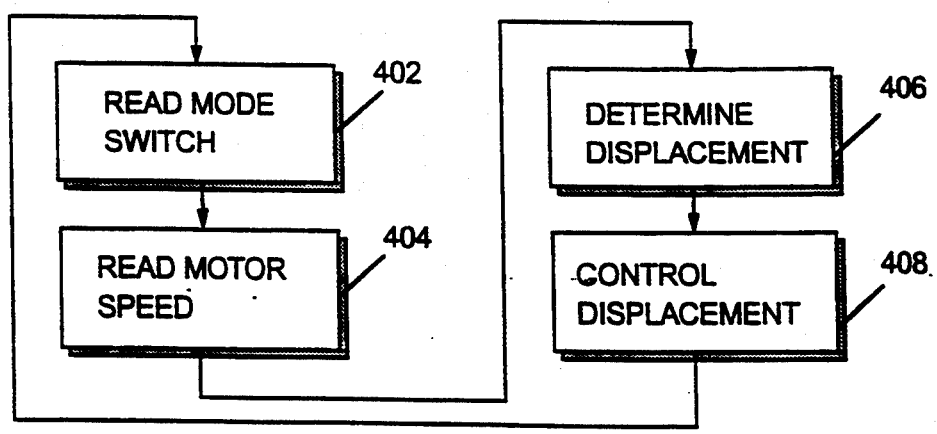
FIG_4

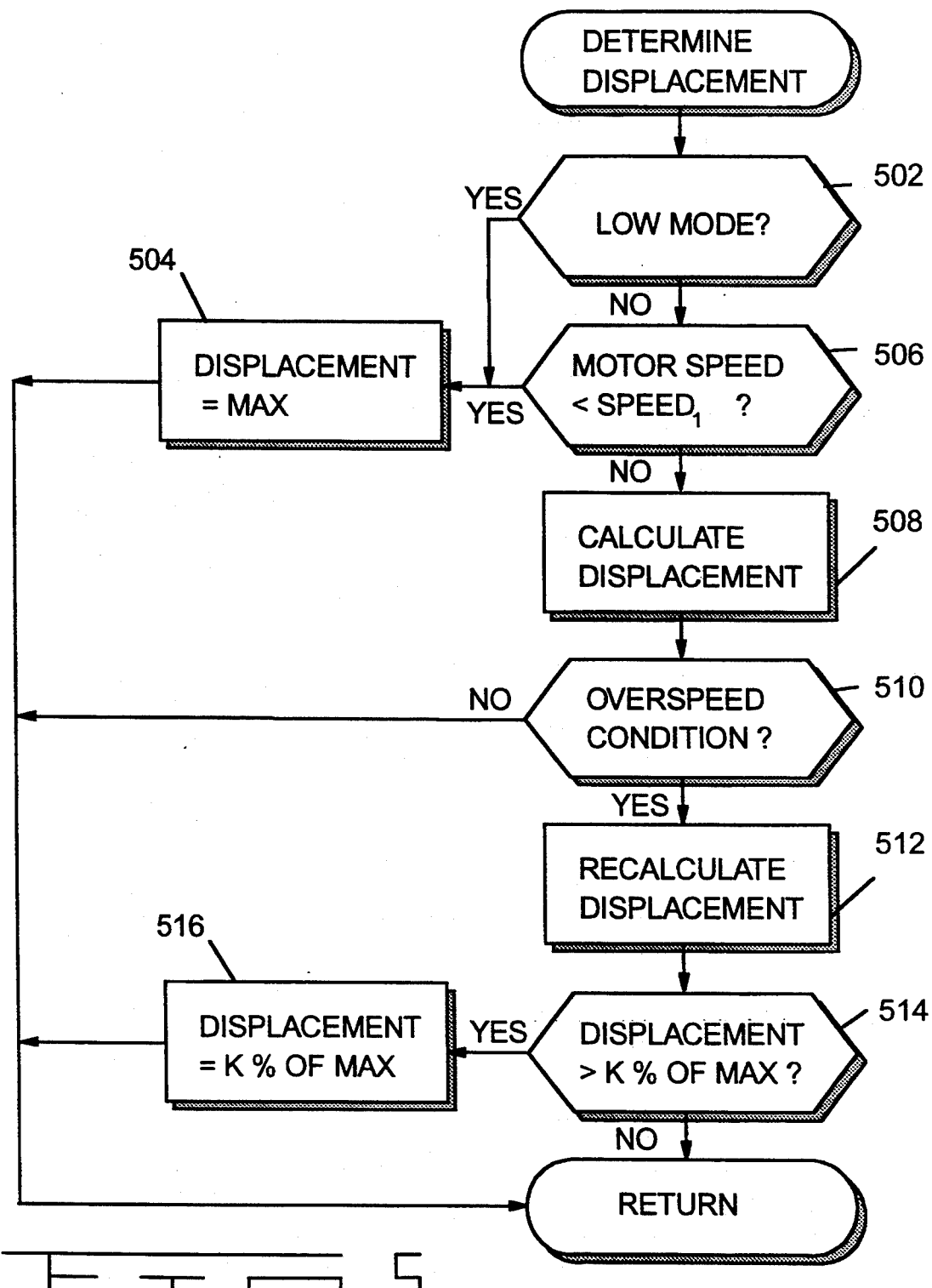
FIG_5

ADAPTIVE OVERSPEED CONTROL FOR A HYDROSTATIC TRANSMISSION

TECHNICAL FIELD

This invention relates generally to hydrostatic transmissions, and more particularly, to adaptive overspeed control of hydrostatic transmissions.

BACKGROUND OF THE INVENTION

In the field of hydrostatic machines, e.g., excavators, variable displacement hydraulic pumps are typically driven by a prime mover, providing hydraulic power to a plurality of work implements as well as to the drive system. The variable displacement hydraulic pumps deliver power to the drive system via at least one variable displacement hydraulic motor.

In earthmoving machines which use hydrostatic transmissions, one of the problems that occur is that the machine will be operated in an overspeed condition. An overspeed condition occurs when the machine is allowed to accelerate, e.g., down a slope, to a speed at which the hydrostatic transmission actually tries to drive the drivetrain. That is the hydraulic motor will act like a pump and the hydraulic pump will act like a motor. This will put undesirable stresses on the drivetrain and the engine in particular. An overspeed condition can thus cause severe damage to the pumps, motor and engine.

One attempt at overcoming this problem uses engine speed. This scheme monitors engine speed and corrects for overspeed conditions. However, such systems are reacting to overspeed conditions and do not eliminate the risk of damage to the drivetrain.

Some systems attempt to correct overspeed conditions by controlling the displacement of the variable displacement hydraulic pump. These types of systems tend to cause instabilities or oscillations in the pump.

The present invention is adapted towards overcoming one or more the problems as set forth above.

SUMMARY OF THE INVENTION

In one aspect of the present invention, a motor and overspeed control apparatus for a hydrostatic transmission is provided. The apparatus includes an engine, a hydraulic pump mechanically coupled to the engine, and a variable displacement hydraulic motor hydraulically coupled to the hydraulic pump. The variable hydraulic motor includes an output shaft. The apparatus monitors the speed of the output shaft and detects and/or predicts the occurrence of an overspeed condition. The displacement of the motor is increased by the apparatus if an overspeed condition is detected or predicted, thereby limiting motor and machine speed.

In another aspect of the present invention, a method for controlling a hydraulic motor of a hydrostatic transmission is provided. The hydraulic motor is driven by a hydraulic pump which is driven by an engine. The method includes the steps of sensing a rotational output speed of the hydraulic motor and responsively controlling the displacement of the motor. The method also detects and/or predicts the occurrence of an overspeed condition and responsively controls motor displacement.

BRIEF DESCRIPTION OF THE DRAWINGS

FIG. 1 is a diagrammatic illustration of an apparatus for controlling the motor of a hydrostatic transmission, according to an embodiment of the present invention;

FIG. 2 is a diagram illustrating a control curve for operating the hydrostatic transmission of FIG. 1, according to an embodiment of tile present invention;

FIG. 3 is a diagram illustrating a control curve for operating the hydrostatic transmission of FIG. 1, according to another embodiment of the present invention;

FIG. 4 is a high level flow diagram illustrating the operation of the control apparatus of FIG. 1; and FIG. 5 is a more detailed flow diagram illustrating operation of the control apparatus of FIG. 1.

DETAILED DESCRIPTION OF THE PREFERRED EMBODIMENT

With reference to FIGS. 1-3, the present invention or motor and overspeed control apparatus 102 is adapted to controllably actuate a variable displacement hydraulic motor 108 of a hydrostatic transmission. The control apparatus 102 includes an engine 104 and a variable displacement hydraulic pump 106 coupled to the engine 104. In the preferred embodiment, the engine 104 and the hydraulic pump 106 are directly coupled. That is, the output of the pump is dependent upon engine output speed and pump displacement.

In the preferred embodiment, the hydraulic pump 106 is hydraulically coupled to two variable displacement hydraulic motors. One motor is hydromechanically controlled. Its operation is not relevant to the present invention and is therefore not further discussed. The other motor is electromechanically operated and is used in controlling overspeed conditions.

In addition, the following description is adapted to a particular hydrostatic transmission arrangement. It should be recognized that there are various different arrangements for which the present invention has utility and which fall under the scope of the present invention. Variations of the hydrostatic transmission and control thereof are illustrated in U.S. Pat. No. 4,080,850 issued on Mar. 28, 1978 to Thomas J. Bubula, Maurice P. Franz, Gordon W. Johnson, and James D. Rinaldo; U.S. Pat. No. 4,534,707 issued on Aug. 13, 1985 to Randall M. Mitchell; and U.S. Pat. No. 4,523,892 issued on Jun. 18, 1985 to Randall M. Mitchell and John T. Armstrong, Jr.

A means 112 varies the displacement of the hydraulic motor and thereby the rotational speed of said output shaft 110. In the preferred embodiment, the means 112 includes a valve means which varies the displacement of the motor 108. In the preferred embodiment, the valve means includes an electrically actuated proportional spool valve (not shown).

The motor displacement is variable between a MAXIMUM position and a MINIMUM position. For a given flow input, the output speed is maximum when the motor is in the MINIMUM position. For the same flow input, as motor displacement is actuated towards the MAXIMUM position, output speed is reduced.

A means 114 coupled to the output shaft 110 senses the rotational speed of the output shaft 110 and responsively produces a speed signal.

A control means 116 receives the speed signal and actuates the means 112 for varying displacement of the motor 108 in response to the speed signal. The control means 116 is adapted to detect the occurrence of an overspeed condition.

The control means 116 is also adapted to predict the occurrence of an overspeed condition as a function of the speed signal and responsively limit the rotational speed of the output shaft 110 by increasing the displacement of the motor 108. In the preferred embodiment, the control means is microprocessor based. The microprocessor is programmed to control the valve means using a control algorithm, as discussed below.

A mode switch 118 has a LOW SPEED position and a HIGH SPEED position indicating a LOW mode and a HIGH mode, respectively. The mode switch 118 is manually actuated by an operator. Under the control algorithm, the control means 116 actuates the means 112 to set the motor displacement at its MAXIMUM position in response to the mode switch being in the LOW position. Thus, the LOW mode is typically used when the machine is performing some operation in which low machine speeds are required.

In the HIGH mode, the control means 116 modulates the displacement of the motor 108 both at low motor speeds and high motor speeds. In the preferred embodiment, the control means 116 modulates motor displacement via the displacement varying means 112 in accordance with a control curve 202.

The control curve 202 includes a normal operating region 204 and an overspeed operating region 206. In the normal operating region 204, the control means 116 modulates displacement from MAXIMUM to MINIMUM. When displacement is at MINIMUM, motor speed is allowed to vary with engine speed. In the overspeed operating region 206, the control means 116 modulates displacement to prevent damage caused by the overspeed condition.

In the preferred embodiment, the control curve is of the form as shown in FIG. 2. Thus, at low motor speeds, the displacement is set at the MAXIMUM position. As the operator presses the accelerator and increases engine speed, the motor output speed will increase. When the motor output speed reaches a first motor speed value (SPEED$_1$), the control means 116 will vary displacement until it is at MINIMUM. A typical first motor speed value is 500 revolutions per minute (rpm). The value of the first motor speed will, however, vary depending upon system parameters. Motor displacement will decrease until it reaches MINIMUM at a second motor speed value (SPEED$_2$).

When the displacement is at the MINIMUM position, output speed is allowed to vary with engine speed. However, if an overspeed speed condition occurs then the control means begins to regulate motor displacement once again. The overspeed operating region 206 of the control curve 202 is defined by a third motor speed value (SPEED$_3$), e.g., 5400 rpm. Thus, an overspeed condition is detected when the motor speed is $\geq$ SPEED$_3$. According to the overspeed operating region 204 of the control curve 202 in FIG. 2, once an overspeed condition is detected the control means 116 will vary motor displacement towards a predetermined percentage (K) of MAXIMUM position, e.g., 33% of MAXIMUM. As shown motor displacement reaches K% of MAXIMUM at a fourth motor speed value (SPEED$_4$).

As motor speed decreases, motor displacement follows the same control curve 202 in reverse.

Preferably, the control curve 202 includes linear modulation of motor displacement as a function of motor speed. However, other modulation schemes may also be used, e.g., a step function or an exponential function.

The slope of both ramping functions will be dependent upon the system parameters and desired operating characteristics.

With reference to FIG. 3, in an alternate embodiment the control curve 302 contains inherent hysteresis. Operation of the control apparatus 102 when the motor speed is increasing is the same as described above. However, the control does not follow the same curve when motor speed is decreasing.

Thus, assuming the system is operating at 33% of MAXIMUM and the motor speed is decreasing, the control means 116 begins to decrease motor displacement when motor speed reaches a fifth motor speed value (SPEED$_5$), where SPEED$_5 \leq$ SPEED$_4$. Displacement will be modulated until it reaches the MINIMUM at a sixth motor speed value (SPEED$_6$), where SPEED$_6 \leq$ SPEED$_4$.

Likewise, as motor speed continues to decrease, the control means will begin to modulate motor displacement from the MINIMUM towards the MAXIMUM at a seventh motor speed value (SPEED$_7$), where SPEED$_7 \leq$ SPEED$_2$. Motor displacement will increase until it reaches MAXIMUM at an eighth motor speed value (SPEED$_8$), where SPEED$_8 \leq$ SPEED$_1$. The hysteresis ensures that the system will not oscillate between increasing and decreasing displacements.

By sensing motor speed instead of engine speed, the apparatus 102 is able to detect an overspeed condition faster or even before the engine 104 reaches an overspeed condition. Thus, the control means 116 includes means for predicting the occurrence of an overspeed condition and to responsively control motor displacement. In the preferred embodiment, the control means 116 modulates motor displacement after predicting an overspeed condition by shifting the overspeed section 206 of the control curve 202 to the left.

With reference to FIGS. 4–5, the operation of the control means 116 will now be discussed. In a first control block 402, the mode switch 118 is read. In a second control block 404, the motor speed sensor is read. In a third control block 406, the required displacement of the motor 108 is determined as a function of the mode switch position and the motor speed (see below). In a fourth control block 408, the control means 116 modulates motor displacement via the valve means.

With reference to FIG. 5, the determination of the desired displacement is illustrated. In a first decision block 502, if the mode switch 118 is in the LOW position then control proceeds to a fifth control block 504. In the fifth control block 504, the displacement is set equal to the MAXIMUM displacement. Control then returns to the main control loop.

In a second decision block 506, if the motor speed is less than the first motor speed value (SPEED$_1$), then control proceeds to the fifth control block 504. If not, then control proceeds to a sixth control block 508.

In the sixth control block 508, the desired displacement of the motor is determined in accordance with the normal operating region 204,304 of the control curve 202,302, as described above. In a third decision block 510, if an overspeed condition is occurring (detected) or is about to occur (predicted) then control proceeds to a seventh control block 512. If an overspeed condition exists, modulation of the displacement will occur via the overspeed operating region 204 of the control curve 202,302.

Otherwise, the displacement calculated in the sixth control block 508 is used and control returns to the main control loop.

The control routine predicts if an overspeed condition is occurring or is about to occur in the following manner: first, a difference term is determined by subtracting the current motor speed from a constant ($K_{SPEED}$), e.g., 5400 rpm. Then, a proportional term is determined by multiplying the difference term by a proportional constant ($K_{PROPORTIONAL}$). A derivative term is determined by subtracting the difference term from a previous or last difference term and multiplying the difference by a constant ($K_{DERIVATIVE}$). The proportional and derivative terms are then summed together. If the sum is greater or equal to zero then the overspeed condition is not predicted and the displacement determine in the sixth control block 508 is used.

Optionally, an integral term may be included in the sum. The integral term is determined by multiplying the difference term by a constant ($K_{INTEGRAL}$) and the result is added to a previous or last integral term.

If, however, the sum is less than zero, then an overspeed condition is predicted and control proceeds to a seventh control block 512.

In the seventh control block 512, the displacement is recalculated by using or modifying the overspeed operating region 206,306 of the control curve 202,302. In a fourth decision block 514, if the recalculated displacement is greater than K % of MAXIMUM, then control proceeds to an eighth control block 516. Otherwise, the recalculated value is used and control returns to the main control loop.

In the eighth control block, an overspeed condition has been predicted or detected and the displacement is limited to K % of the MAXIMUM. A typical value of K is 33%.

Industrial Applicability

With reference to the drawings and in operation, the present invention or apparatus 102 is adapted to provide an adaptive overspeed control for a variable displacement motor 108 in a hydrostatic transmission.

The apparatus 102 includes an operator actuated mode switch 118. The mode switch is actuatable between a LOW SPEED position and a HIGH SPEED position. The apparatus 102 includes a control means 116. The control means 116 reads the mode switch 118 and modulates the displacement of the hydraulic motor in response.

If the mode switch 118 is in the LOW position, the control means 116 operates in a LOW mode. In the LOW mode, the control means 116 sets the displacement of the hydraulic motor 108 at its MAXIMUM.

If the mode switch is in the HIGH SPEED position, the control means 116 operates in a HIGH mode. In the HIGH mode, the control means 116 modulates motor displacement, both at low and high motor speeds. At very low motor speeds, e.g., less than 500 RPM, the control means 116 sets motor displacement at MAXIMUM. As motor speed increases, displacement is modulated until it reaches a MINIMUM position. This is normal operation.

If the motor speed increases to a predetermined value, e.g., 5400 rpm, then an overspeed condition is detected. If an overspeed condition is detected, the control means 116 modulates motor displacement according to a control curve. That is, the control means 116 modulates motor displacement from the MINIMUM towards a predetermined percentage of the MAXIMUM (K %).

In addition, the control means 116 is adapted to predict the occurrence of the overspeed condition (see above). When an overspeed condition is predicted, the control means 116 shifts the control curve to the left and responsively modulates motor displacement.

Other aspect, objects, and features of the present invention can be obtained from a study of the drawings, the disclosure, and the appended claims.

We claim:

1. A motor and overspeed control apparatus for a hydrostatic transmission: comprising:

an engine;

a hydraulic pump mechanically coupled to said engine, a variable displacement hydraulic motor hydraulically coupled to said hydraulic pump and including an output shaft;

means for varying a displacement of said motor;

means coupled to said output shaft for sensing rotational speed of said output shaft and responsively producing a speed signal;

control means for receiving said speed signals, responsively detecting an overspeed condition of said engine, and modulating said displacement via said displacement varying means in response to detecting said overspeed condition;

wherein said control means includes means for predicting the occurrence of said overspeed condition as a function of said speed signal and responsively modulating said displacement via said displacement varying means in response to predicting said overspeed condition; and wherein said control means is adapted to modulate said displacement by actuating said displacement varying means in accordance with a control curve.

2. A motor and overspeed control apparatus, as set forth in claim 1, wherein said control means modulates said displacement in response to predicting the occurrence of said overspeed condition by modifying said control curve.

3. A motor and overspeed control apparatus, as set forth in claim 1, wherein said control curve varies said displacement between a MAXIMUM and a MINIMUM at lower motor speeds and varies said displacement between said MINIMUM and K % of said MAXIMUM at higher motor speeds.

4. A motor and overspeed control apparatus, as set forth in claim 3, wherein said control curve contains inherent hysteresis.

5. A motor and overspeed control apparatus for a hydrostatic transmission; comprising:

an engine;

a hydraulic pump mechanically coupled to said engine, a variable displacement hydraulic motor hydraulically coupled to said hydraulic pump and including an output shaft;

means for varying a displacement of said motor;

means coupled to said output shaft for sensing rotational speed of said output shaft and responsively producing a speed signal;

control means for receiving said speed signal, responsively detecting an overspeed condition of said engine, and modulating said displacement via said displacement varying means in response to detecting said overspeed condition;

wherein said control means includes means for predicting the occurrence of said overspeed condition as a function of said speed signal and responsively modulating said displacement via said displacement varying means in to response predicting said overspeed condition; and, a mode switch having a LOW position and a HIGH position, wherein said control means being adapted to set said displacement to a MAXIMUM in response to said mode switch being in said LOW position, said control means being adapted to vary said displacement in accordance with a control curve in response to said mode switch being in said HIGH position.

6. A motor and overspeed control apparatus for a hydrostatic transmission, comprising:

a mode switch having a LOW position and a HIGH position an engine;

a hydraulic pump mechanically coupled to said engine, a variable displacement hydraulic motor hydraulically coupled to said hydraulic pump and including an output shaft;

means for varying a displacement of said variable displacement hydraulic motor;

means coupled to said output shaft for sensing rotational speed of said output shaft and responsively producing a speed signal; and control means for settings aid displacement to a MAXIMUM in response to said mode switch being in said LOW position and for, in response to said mode switch being in said HIGH position, receiving said speed signal, and responsively modulating said displacement via said displacement varying means in accordance with a control curve, and predicting the occurrence of an overspeed condition as a function of said speed signal and modifying said control curve in response to predicting the occurrence of said overspeed condition.

7. A method for controlling a variable displacement hydraulic motor of a hydrostatic transmission, the hydraulic motor being driven by a hydraulic pump which is driven by an engine comprising:

(1) sensing rotational output speed of the hydraulic motor and responsively producing a speed signal;

(2) predicting an overspeed condition as a function of said speed signal; and, (3) modulating a motor displacement in response to predicting said overspeed condition, wherein said step of predicting an overspeed condition includes the steps of:

(a) determining a difference term by subtracting said speed signal from a motor speed constant;

(b) determining a proportional term by multiplying said difference term by a proportional constant;

(c) determining a derivative term by subtracting a last difference term from said difference term and multiplying the difference by a constant; and (d) determining a sum term by adding said proportional and derivative terms, wherein said overspeed condition is predicted if said sum term is less than zero.

8. A method, as set forth in claim 7, including the step of determining an integral term by multiplying said difference term by an integral constant and adding the result to a previous integral term; and wherein said sum term is the sum of said proportional, derivative and integral terms.

9. A method for controlling a variable displacement hydraulic motor of a hydrostatic transmission, the variable hydraulic motor being driven by a hydraulic pump which is driven by an engine, comprising:

(1) detecting one of a LOW position and a HIGH position of a mode switch;

(2) performing steps (a)-(c) if said mode switch is in said HIGH position;

(a) sensing a rotational output speed of the hydraulic motor and responsively producing a speed signal;

(b) receiving said speed signal and responsively modulating a motor displacement in accordance with a normal operating region of a control curve; and (c) predicting the occurrence of an overspeed condition and responsively modulating said motor displacement in accordance with an overspeed operating region of said control curve.

10. A method, as set forth in claim 9, including:

(3) setting said motor displacement of the variable hydraulic motor to MAXIMUM if said mode switch is in said LOW position.

11. A method, as set forth in claim 9, including the step of modifying said overspeed operating region in response to predicting the occurrence of said overspeed condition.

12. A method, as set forth in claim 9, wherein said step of modulating said motor displacement includes:

(3) performing steps (d)-(e) if the rotational output speed is accelerating;

(d) modulating said motor displacement from a MAXIMUM to a MINIMUM in said normal operating region, if said speed signal is greater than a first predetermined value;

(e) modulating said motor displacement from said MINIMUM to K % of said MAXIMUM in said overspeed operating region, if said speed signal is greater than a second predetermined value; and (4) performing steps (f)-(g) if the rotational output speed is decelerating;

(f) modulating said motor displacement from K % of MAXIMUM to a MINIMUM in said overspeed operating region, if said speed signal is less than a third predetermined value;

(g) modulating said motor displacement up from said MINIMUM to said MAXIMUM in said normal operating region, if said speed signal is less than a fourth predetermined value.

13. A method, as set forth in claim 9, wherein said step of predicting an overspeed condition includes the steps of:

determining a difference term by subtracting said speed signal from a motor speed constant;

determining a proportional term by multiplying said difference term by a proportional constant;

determining a derivative term by subtracting a last difference term from said difference term and multiplying the difference by a constant; and determining a sum term by adding said proportional and derivative terms, wherein said overspeed condition is predicted if said sum term is less than zero.

14. A method, as set forth in claim 13, including the step of determining an integral term by multiplying said difference term by an integral constant and adding the result to a previous integral term; and wherein said sum term is the sum of said proportional, derivative and integral terms.

15. A method for controlling a variable hydraulic motor of a hydrostatic transmission, the variable hydraulic motor being driven by a hydraulic pump which is driven by an engine, comprising:
(1) detecting one of a LOW SPEED position and a HIGH position of a mode switch;
(2) performing steps (a)-(c) if said mode switch is in said HIGH position:
   (a) sensing rotational output speed of the hydraulic motor and responsively producing a speed signal;
   (b) receiving said speed signal and responsively modulating a displacement of the variable hydraulic motor in accordance with a normal operating region of a control curve;
   (c) predicting the occurrence of an overspeed condition, responsively modulating said displacement in accordance with an overspeed operating region of a control curve, and modifying said overspeed operating region of said control curve in response to predicting said overspeed condition;
   (d) performing steps (i)-(ii) if the rotational output speed is accelerating;
      (i) modulating said displacement from a MAXIMUM to a MINIMUM in said normal operating region, if said speed signal is greater than a first predetermined value;
      (ii) modulating said displacement from said MINIMUM to K % of said MAXIMUM in said overspeed operating region, if said speed signal is greater than a second predetermined value;
   (e) performing steps (iii)-(iv) if the rotational output speed is decelerating;
      (iii) modulating said displacement from K % of MAXIMUM to a MINIMUM in said overspeed operating region, if said speed signal is less than a third predetermined value;
      (iv) modulating said displacement from said MINIMUM to said MAXIMUM in said normal operation region, if said speed signal is less than a fourth predetermine value; and
(3) setting said displacement to MAXIMUM flow if said mode switch is in said LOW position.

16. A method, as set forth in claim 15, wherein said step of predicting an overspeed condition includes the steps of:
determining a difference term by subtracting said speed signal from a motor speed constant;
determining a proportional term by multiplying said difference term by a proportional constant;
determining a derivative term by subtracting a last difference term from said difference term and multiplying the difference by a constant; and
determining a sum term by adding said proportional and derivative terms; wherein said overspeed condition is predicted if said sum term is less than zero.

17. A method, as set forth in claim 15, including the step of determining an integral term by multiplying said difference term by an integral constant and adding the result to a previous integral term; and wherein said sum term is the sum of said proportional, derivative and integral terms.

* * * * *

UNITED STATES PATENT AND TRADEMARK OFFICE
CERTIFICATE OF CORRECTION

PATENT NO. : 5,435,131
DATED : July 25, 1995
INVENTOR(S) : Dennis J. Hausman et al It is certified that error appears in the above-indentified patent and that said Letters Patent is hereby corrected as shown below:

In claim 6, column 7, line 32, delete "settings aid" and replace with --setting said--.

Signed and Sealed this

Twelfth Day of March, 1996

Attest:

BRUCE LEHMAN

Attesting Officer

Commissioner of Patents and Trademarks